3,705,916
TETRA(BICYCLOHEPTYL) TRANSITION METAL COMPOUNDS
Barton K. Bower, Newark, Del., assignor to Hercules Incorporated, Wilmington, Del.
No Drawing. Filed Feb. 2, 1971, Ser. No. 112,024
Int. Cl. C07f 7/00
U.S. Cl. 260—429.3                    3 Claims

ABSTRACT OF THE DISCLOSURE

Tetravalent organometallic compounds of transition metals are described wherein the metal is attached to the bridge-head carbon of four bicyclic radicals, namely, a 1-bicyclo-[2·2·1]-heptyl radical that contains not more than one methyl group on a carbon adjacent to the bridgehead carbon. Typical compounds are tetrakis(1-norbornyl)titanium and the corresponding zirconium, hafnium, vanadium, chromium, manganese, iron and cobalt compounds. These organometallic compounds have many uses including their use as catalysts for the polymerization of vinyl monomers.

---

This invention relates to a new class of organometallic compounds and more particularly to tetravalent compounds of transition metals wherein the metal is attached to the bridgehead carbon of bicyclic hydrocarbon radicals.

Organometallic compounds of many of the metals of the A groups of the Periodic Table and of the B groups of Groups I and II are known, but relatively few organometallic compounds of the transition metals of Groups IV–B, V–B, VI–B, VII–B and VIII are known and these are chiefly the so-called sandwich compounds in which the organo groups are bound to the metal as planar systems, as for example, the π-allyl transition metal compounds, the bis(arene) transition metal compounds and the metallocenes such as ferocene, chromocene, etc.

Now in accordance with this invention, a unique class of organo-tetravalent transition metal compounds has been discovered wherein the metal is bound to the bridgehead carbons of four bicyclic hydrocarbon radicals. These new organometallic compounds have the formula $Y_4M$ where Y is a 1-bicyclo-[2·2·2]-heptyl radical which can be substituted with up to 3 methyl groups, with not more than one methyl group on a carbon adjacent to the bridgehead carbon, i.e., in the 2, 6 or 7 position. Thus the compounds of this invention will have the formula

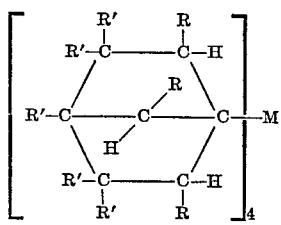

where M is a transition metal selected from Ti, Zr, Hf, V, Cr, Mn, Fe, and Co and where one R is H or $CH_3$ and the other R's are H and each of the R's is H or $CH_3$, and the total number of $CH_3$ groups attached to the bicyclic radical is 0 to 3. Exemplary of these 1-bicyclo-[2·2·1]-heptyl radicals are 1-bicyclo-[2·2·1]-heptyl also known as 1-norbornyl
2-methyl-1-bicyclo-[2·2·1]-heptyl
3-methyl-1-bicyclo-[2·2·1]-heptyl
4-methyl-1-bicyclo-[2·2·1]-heptyl
7-methyl-1-bicyclo-[2·2·1]-heptyl
2,3-dimethyl-1-bicyclo-[2·2·1]-heptyl
2,4-dimethyl-1-bicyclo-[2·2·1]-heptyl
2,5-dimethyl-1-bicyclo-[2·2·1]-heptyl
3,3-dimethyl-1-bicyclo-[2·2·1]-heptyl
3,4-dimethyl-1-bicyclo-[2·2·1]-heptyl
3,5-dimethyl-1-bicyclo-[2·2·1]-heptyl
3,7-dimethyl-1-bicyclo-[2·2·1]-heptyl
4,7-dimethyl-1-bicyclo-[2·2·1]-heptyl
2,3,3-trimethyl-1-bicyclo-[2·2·1]-heptyl also known as 1-camphyl
2,3,4-trimethyl-1-bicyclo-[2·2·1]-heptyl
2,3,5-trimethyl-1-bicyclo-[2·2·1]-heptyl
2,5,5-trimethyl-1-bicyclo-[2·2·1]-heptyl
3,3,7-trimethyl-1-bicyclo-[2·2·1]-heptyl
3,4,6-trimethyl-1-bicyclo-[2·2·1]-heptyl
3,4,7-trimethyl-1-bicyclo-[2·2·1]-heptyl.

These new bridgehead, tetravalent, transition metal compounds are surprisingly very stable and because of this are readily handled and utilized. One of their unique properties is their ability to undergo thermal and/or photochemical decomposition to yield free radicals in contrast to the usual decomposition and dehydrogenation of such metal alkyls to a stable olefin. As a result they are useful catalysts for the polymerization and copolymerization of vinyl monomers such as styrene, acrylonitrile, methyl methacrylate, etc. In the case of monomers having electron deficient double bonds, polymerization and copolymerization with these catalysts is very rapid even at room temperature. These new organometallics are also useful for cross-linking carboxylated polymers where a delayed reaction is desired as in coatings, adhesives, and plastic applications. In contrast to the immediate cross-linking obtained with metal salts, these organometallics can be mixed with the carboxylated polymer and then cross-linking can be effected by either thermal or photochemical activation.

The bridgehead-transition metal compounds of this invention can be prepared by the reaction of the corresponding bridgehead lithium compound with a transition metal salt or alkoxide. The bridgehead lithium compound is, as described in the literature, generally prepared by reaction of a bridgehead halide with metallic lithium. Bridgehead lithium compounds that can be so prepared and used to prepare the organometallic compounds of this invention are 1-norbornyllithium; 1-camphyllithium; 2-methyl-1-bicyclo-[2·2·1]-heptyllithium; 2,3-dimethyl-1-bicyclo-[2·2·1]-heptyllithium; 2,3,3-trimethyl - 1-bicyclo-[2·2·1]-heptyllithium; etc. Any halide or tertiary butoxide of titanium, zirconium, hafnium, vanadium, chromium, manganese, iron or cobalt can be reacted with the bridgehead lithium compound. Regardless of the valence of the metal in the salt or alkoxide being reacted, the product is always tetravalent. For example, titanium trichloride and titanium tetrachloride both yield tetrakis-norbonyl titanium, and chromium dichloride and chromium trichloride both yield tetrakis-norbonyl chromium, etc. In many cases it is advantageous to use an ether complex of the metal salt. Exemplary of the transition metal salts and alkoxides that can be reacted to produce the compounds of this invention are titanium trichloride tetrahydrofuranate (TiCl$_3$·3THF), titanium tetrachloride, titanium tetrafluoride, titanium tetrachloride tetrahydrofuranate (TiCl$_4$·2THF), zirconium tetrachloride etherate (ZrCl$_4$·2Et$_2$O), zirconium tetrabromide, hafnium tetrachloride etherate (HfCl$_4$·2Et$_2$O), vanadium tetrachloride, vanadium tetra(tert-butoxide), vanadium trichloride tetrahydrofuranate (VCl$_3$·3THF), chromium trichloride, chromium trichloride tetrahydrofuranate (CrCl$_3$·3THF), chromium dichloride, chromium difluoride, chromium diiodide, chromium dimethoxide, chromium trimethoxide, chromium tetra(tert-butoxide), manganese dibromide, manganese dichloride, manganese difluoride, manganese trifluoride, manganese dichloride tetrahydrofuranate (MnCl$_2$·1.5THF), ferric chloride, ferrous chloride, ferric chloride etherate (FeCl$_3$·Et$_2$O), cobalt dichloride, cobalt dichloride tetrahydrofuranate (CoCl$_2$·1.5THF), etc.

The reaction between the bridgehead lithium compound and the transition metal salt is carried out in a saturated hydrocarbon diluent such as pentane, hexane, heptane, cyclohexane, etc. The temperature at which the reaction is carried out can be varied widely but generally will be within the range of from about −78° C. to about 100° C. In some cases it is desirable to start the reaction at a low temperature such as −78° C. and then continue it at a higher temperature.

The following examples will illustrate the preparation of the organometallic compounds of this invention.

EXAMPLES 1–30

In each of these examples, a transition metal compound was reacted with 1-norbornyl lithium using 25 ml. of pentane as the diluent under a nitrogen atmosphere. At the end of the reaction, basic alumina was either added to the reaction mixture and the pentane phase separated and/or the pentane phase was filtered through a column of basic alumina. The pentane was then removed from the filtrate, the residue was washed with pentane and then was dried under vacuum. In the following table are set forth the amount of each of the reactants used, the reaction conditions and the percent yield of the tetrakis-(1-norbornyl-) metal compound.

Preparation of 1-norbornyllithium

To a refluxing dispersion (argon atomsphere) of 2 g. of lithium in 20 ml. of hexane was added, over a period of 3 hours, 10.0 g. of 1-norbornyl chloride in 20 ml. of hexane. The reaction mixture was refluxed for 16 hours and then was allowed to separate at room temperature into phases. The hexane phase was transferred to a centrifuge bottle and the solvent and volatile by-products were removed under reduced pressure. The 1-norbornyllithium so obtained was a white crystalline product and amounted to an 82% yield.

| Example | Transition metal compound | Mmoles | 1-norbornyl lithium, mmoles | Reaction conditions Time | Temp., °C. | Percent yield |
|---|---|---|---|---|---|---|
| 1 | TiCl$_4$ | 9.6 | 38 | Mixed at / Stirred 1 hour | −10 / 25 | 4 |
| 2 | TiF$_4$ | 3.5 | 14 | Ball milled 3 days | 35 | 10 |
| 3 | TiCl$_4$·2 THF | 3.35 | 13.8 | Mixed at / Stirred 23 hours | −78 / 4 | 68 |
| 4 | TiCl$_4$·2 THF | 3.55 | 13.5 | Mixed at / Stirred 1 hour | −40 / 5 | 90 |
| 5 | TiCl$_4$·2 THF | 3.42 | 12.9 | Mixed at / Stirred 1 hour | −40 / 5 | 55 |
| 6 | TiCl$_4$·2 THF | 3.14 | 13.5 | Mixed at / Stirred 1.5 hours | −40 / 0 | 54 |
| 7 | TiCl$_3$·3 THF | 4.45 | 14.6 | Mixed at / Stirred 2 hours / Then 5 days | −78 / −25 / 4 | 26 |
| 8 | ZrCl$_4$·2 Et$_2$O | 3.78 | 14.9 | Mixed at / Stirred 14 days | −78 / 5 | 45 |
| 9 | HfCl$_4$·2 Et$_2$O | 3.57 | 14.1 | Mixed at / Stirred 5 days | −78 / 5 | 40 |
| 10 | V(O-t-butyl)$_4$ | 1.47 | 6.39 | Mixed at / Stirred 4 hours | −78 / 80 | 22 |
| 11 | CrCl$_3$ | 13.1 | 39 | Ball mill 5 days | 35 | 22 |
| 12 | CrCl$_3$ | 17.7 | 53 | do 22 hours | 35 | 22 |
| 13 | CrCl$_2$ | 13.0 | 25 | do 3 days | 35 | 20 |
| 14 | CrF$_2$ | 6.3 | 11.9 | do 11 days | 35 | 13 |
| 15 | CrI$_2$ | 5.85 | 12.3 | do do | 35 | 19 |
| 16 | CrCl$_3$·3 THF | 4.43 | 13.1 | Tumbled with glass beads. 12 days | 35 | 66 |
| 17 | CrCl$_3$·3 THF | 5.90 | 4.65 | Ball mill do | 35 | 71 |
| 18 | Cr(OCH$_3$)$_2$ | 15.2 | 31.4 | do 6 days | 35 | 4.4 |
| 19 | Cr(OCH$_3$)$_3$ | 3.17 | 11.8 | do do | 35 | 19 |
| 20 | Cr(O—t—butyl)$_4$ | 0.72 | 2.95 | Stirred 5 days | 25 | 56 |
| 21 | MnBr$_2$ | 7.16 | 14.9 | Ball mill 14 days | 35 | 62 |
| 22 | MnF$_3$ | 4.73 | 13.4 | do do | 35 | 33 |
| 23 | MnF$_2$ | 6.52 | 14.1 | do do | 35 | 27 |
| 24 | MnCl$_2$ | 9.95 | 19.4 | do do | 35 | 12 |
| 25 | MnCl$_2$·1.5 THF | 9.75 | 18.9 | do do | 35 | 27 |
| 26 | FeCl$_3$ | 4.80 | 12.3 | Stirred 5 days | 4 | 18 |
| 27 | FeCl$_3$ | 7.50 | 13.5 | do 28 days | 4 | 44 |
| 28 | FeCl$_3$·(C$_2$H$_5$)$_2$O | 9.3 | 28.0 | do 14 days | 4 | 50 |
| 29 | CoCl$_2$ | 8.05 | 13.2 | do 24 days | 4 | 6 |
| 30 | CoCl$_2$·1.5 THF | 6.45 | 13.1 | do 10 days | 4 | 47 |

The products of Examples 8–11, 26 and 29 were further purified by recrystallization from pentane at −78° C.

Tabulated below are typical analyses obtained on the products produced in the above examples. In each case, regardless of the valence of the transition metal in the starting compound, the product was a tetrakis norbornyl metal compound. This was established by one or more techniques selected from NMR, ultraviolet visible spectrum, mass spectrum, ESR, and other such methods.

|  | Found | Theory |
|---|---|---|
| Tetrakis-(1-norbornyl) titanium: |  |  |
| Elemental analysis (percent): |  |  |
| Li | Nil | 0 |
| C | 78.04 | 78.47 |
| H | 10.36 | 10.35 |
| Ti | 10.9 | 11.18 |
| Molecular weight: |  |  |
| Vapor pressure | 384 | 428 |
| Cryoscopic | 381 | 328 |
| Half-life * | 29 hours at 100° C. |  |
| Tetrakis-(1-norbornyl) zirconium: |  |  |
| Elemental analysis (percent): |  |  |
| Li | Nil | 0 |
| Cl | 0.15 | 0 |
| Zr | 16.0 | 19.34 |
| Norbornyl analysis (percent) | 75.9 | 80.67 |
| Tetrakis-(1-norbornyl) hafnium: |  |  |
| Elemental analysis (percent): |  |  |
| Li | Nil | 0 |
| Cl | 0.15 | 0 |
| Hf | 26.1 | 31.96 |
| Norbornyl analysis (percent) | 65.3 | 68.04 |

TABLE—Continued

|  | Found | Theory |
|---|---|---|
| Tetrakis-(1-norbornyl) vanadium: | | |
| Elemental analysis (percent): | | |
| Li | Nil | 0 |
| C | 76.88 | 77.92 |
| H | 10.14 | 10.28 |
| V | 10.8 | 11.80 |
| Tetrakis-(1-norbornyl) chromium: | | |
| Elemental analysis (percent): | | |
| Li | Nil | 0 |
| C | 76.28 | 77.73 |
| H | 10.42 | 10.25 |
| Cr | 11.5 | 12.02 |
| Molecular weight: | | |
| Vapor pressure | 443 | 432 |
| Cryoscopic | 441 | 432 |
| Half-life | 7.6 hours at 250° C. | |
| Tetrakis-(1-norbornyl) manganese: | | |
| Elemental analysis: | | |
| Li | 0.2 | 0 |
| Cl | 0.22 | 0 |
| C | 75.85 | 77.20 |
| H | 10.18 | 10.19 |
| Mn | 10.5 | 12.61 |
| Molecular weight: Cryoscopic | 477 | 435 |
| Half-life | 13.7 min at 100° C. | |
| Tetrakis-(1-morbornyl) iron: | | |
| Elemental analysis: | | |
| Li | Nil | 0 |
| C | 76.06 | 77.05 |
| H | 10.28 | 10.16 |
| Fe | 10.9 | 12.79 |
| Molecular weight: Cryoscopic | 418 | 436 |
| Half-life | 30 hours at 23° C. | |
| Tetrakis-(1-norbornyl) cobalt: | | |
| Elemental analysis: | | |
| Li | Nil | 0 |
| Cl | 0.25 | 0 |
| C | 75.37 | 76.50 |
| H | 10.06 | 10.09 |
| Co | 8.96 | 13.41 |
| Molecular weight: Cryoscopic | 416 | 439 |
| Half-life | 8.7 min. at 100° C. | |

\* The time for half of a sample in hydrocarbon solution under nitrogen to decompose at the given temperature.

All of the tetrakis norbornyl metal compounds were soluble in aliphatic hydrocarbons such as pentane, hexane, and isooctane, as well as in cyclohexane, decahydronaphthalene, benzene, pyridine and tetrahydrofuran.

The tetrakis norbornyl iron compound was the least thermally stable, whereas the titanium, chromium, manganese and cobalt compounds were stable at room temperature in anerobic decahydronaphthalene for months. The iron, manganese and cobalt compounds decomposed in air and in a sulfuric acid-dioxane solution at a slightly greater rate than the rate of thermal decomposition at room temperature. The titanium compound did not react with air and only slowly with sulfuric acid in dioxane. The chromium compound was the most stable of these compounds to the action of air, sulfuric acid and carbon tetrachloride. In addition, it did not react with triethylaluminum or hydrogen and only very slowly with chlorine. None of the compounds coordinated with pyridine showing the stearic inability of reagents to attack the metal-carbon bond.

EXAMPLE 31

Preparation of 1-camphyllithium

A solution of 5.0 g. of 1-chloro-2,3,3-trimethylbicyclo-[2·2·1]heptane in 15 ml. of cyclohexane was added dropwise over 2 hours to 1.5 g. of lithium powder in 7 ml. of refluxing cyclohexane under an atmosphere of argon. The reaction mixture was then heated under reflux for about 16 hours. It was then centrifuged to remove the lithium chloride and unreacted lithium. The solution of 1-(2,3,3-trimethylbicyclo[2·2·1]heptyl)lithium was decanted and the cyclohexane was removed under vacuum. The product so obtained amounted to 3.92 g. and contained $5.44 \times 10^{-3}$ moles of the lithium compound per gram, a yield of 74% of the theoretical yield.

Preparation of tetrakis-(1-camphyl) chromium

To a mixture of 1.352 g. of tris-tetrahydrofuran chromium trichloride in 25 ml. of pentane at −78° C. was added 1.993 g. of the above product. The reaction mixture was allowed to warm to room temperature and was stirred for 3 days. It was then centrifuged and the pentane solution was decanted. The insoluble residue was washed three times with 50 ml. of pentane. The pentane solution and washings were combined and after passing through a column of 5 g. of anhydrous, base-treated alumina, the pentane was removed under vacuum. The crude product was then recrystallized from hexane. The tetrakis-1-(2,3,3-trimethylbicyclo[2·2·1]heptyl) chromium so obtained was a black powder and amounted to a yield of 38%. Analysis showed it to contain no lithium, 0.21% chlorine, 79.39% carbon, 11.14% hydrogen and 7.80% chromium. The theoretical values for $(C_{10}H_{17})_4Cr$ are 0, 0, 79.93, 11.40 and 8.65%, respectively. Magnetic susceptibility showed that the chromium had a valence of 4. The compound had a half-life of 39 minutes in decahydronaphthalene solution at 115° C.

The following examples demonstrate the utility of these new organometallic compounds in a wide variety of applications.

EXAMPLES 32–35

In each of these examples, 25 g. of a commercial unsaturated polyester-styrene resin solution (maleic anhydride-phthalic anhydride-propylene glycol polyester) was mixed under nitrogen with an amount of a 2% solution of a tetrakis(1-norbornyl) metal compound at room temperature. In the following table is specified the metal compound added and the amount thereof along with the time required for the mixture to gel (i.e., cross-link) in each case.

|  | Example | | | | | Control |
|---|---|---|---|---|---|---|
|  | 32 | 33a | 33b | 34 | 35 | |
| Tetrakis (norbornyl): | | | | | | |
| Iron, grams | 0.016 | | | | | |
| Manganese, grams | | 0.010 | | | | |
| Do. | | | 0.010 | | | |
| (+ cobalt naphthenate), grams | | | 0.015 | | | |
| Cobalt, grams | | | | 0.010 | | |
| Chromium, grams | | | | | 0.020 | |
| Gel time (min.) | 2 | 3 | 6 | 3 | ¹6 | ¹22 |

¹ Exposed to a high intensity light source.

EXAMPLE 36

A 5% solution of tetrakis(1-norbornyl) titanium in xylene was used to write on an injection molded plaque of polypropylene. After air-drying to evaporate the solvent, the plaque was heated at 150° C. for 1 hour. The writing had turned yellow and was clearly visible. The opaque yellow material could not be removed even by vigorous rubbing with xylene, demonstrating that it had penetrated into the surface of the polypropylene.

EXAMPLE 37

A solution of a maleic anhydride-modified ethylene-propylene rubber (containing 2.5% combined maleic anhydride and having an acid number of 28.4) was prepared by heating 5.0 g. of the solid polymer in 93 g. of xylene and 2 g. of anhydrous ethanol to 80° C. to 4.7 g. of this solution was added 0.615 ml. of a 2% solution of tetrakis(1-norbornyl) manganese in xylene and the mixture was heated at 100° C. It gelled in 1 hour and the product was colorless. In a control where none of the norbornyl manganese was added the mixture had not gelled even after 30 hours' heating.

EXAMPLE 38

Example 37 was repeated except that a 2% solution of tetrakis(1-norbornyl) chromium was used in place of the tetrakis(1-norbornyl) manganese and the mixture was exposed to a high intensity light source at room temperature instead of heating. The mixture gelled in 38 minutes and the product was colorless. A control sample to which the chromium compound had not been added had not gelled even after 30 hours.

EXAMPLES 39–40

In these examples various ethylenically unsaturated monomers were polymerized using tetrakis(1-norbornyl) manganese as the catalyst. In each case the monomer (or monomers) was charged to a polymerization vessel and under a nitrogen atmosphere the catalyst, as a 2.0% solution in xylene, was added. The polymerization was carried out at 25° C. in each case.

Tabulated below is the monomer(s) and amount thereof, the amount of the 2% solution of the catalyst added and the time required for gel formation.

|  | Example | |
|---|---|---|
|  | 39 | 40 |
| Acrylonitrile, grams | 10 | |
| Styrene, grams | | 11.4 |
| Maleic anhydride, grams | | 1.1 |
| Catalyst solution, ml | 0.46 | 0.57 |
| Gel time, min | 17 | 19 |

EXAMPLES 41–44

These examples illustrate the use of the compounds of this invention as catalysts for the polymerization of ethylene.

In each of these examples a polymerization vessel, filled with argon was charged with 50 ml. of purified n-heptane and activator, if used. With the vessel and contents at 25° C., the vessel was pressured to 30 p.s.i.g. with ethylene and a heptane solution of a (norbornyl)$_4$ metal was injected. The temperature was then increased to the reaction temperature. At the end of the given reaction time, the vessel was vented and cooled and the diluent was evaporated to obtain the polyethylene. In the following table is set forth the norbornyl metal compound used as the catalyst and the amount thereof together with the activator and amount used, the reaction temperature and time and the yield of polyethylene expressed as grams per millimole of catalyst and the productivity rate expressed as grams per millimole of catalyst per atmosphere of ethylene per hour.

| | Catalyst | | Activator | | Reaction | | Polyethylene produced | |
|---|---|---|---|---|---|---|---|---|
| Examples | Tetrakis (norbornyl) | Amount, moles | | Amount, moles | Temp., °C. | Time, hr. | Yield, g./mmole | Rate, g./ mmole/ atm./hr. |
| 41 | Zirconium | 2.0×10⁻⁵ | C₂H₅AlCl₂ | 4.0×10⁻⁵ | 65 | 2.2 | 600 | 13.6 |
| 42 | Titanium | 1.0×10⁻⁵ | (C₂H₅)₃Al | 2.0×10⁻⁵ | 55 | 2.7 | 13 | 2.4 |
| 43 | Chromium | 1.0×10⁻⁵ | (C₂H₅)₃Al | 2.0×10⁻⁵ | 50 | 3.3 | 24 | 3.6 |
| 44a | Vanadium | 1.0×10⁻⁵ | (C₂H₅)₂AlCl | 2.5×10⁻⁵ | 55 | 1.8 | 32 | 9 |
| 44b | do | 1.0×10⁻⁷ | C₂H₅AlCl₂ | 5.0×10⁻⁵ | 40 | 0.9 | 10,590 | 6,000 |

EXAMPLE 45

Propylene was polymerized using tetrakis(norbornyl) titanium as the catalyst.

A 1.184 g. sample of silica gel was dried at 120° C. for 16 hours. To it was added 2.41×10⁻⁴ moles of tetrakis(norbornyl) titanium and 20 ml. of isooctane. After stirring the mixture for 22 hours at room temperature, the isooctane was removed under vacuum.

A portion of this catalyst (0.17 g.) was transferred to a polymerization vessel containing 300 ml. of heptane. The reactor was pressured to 40 p.s.i.g. with propylene and with the temperature at 50° C. an amount of diethylaluminum chloride equal to an aluminum to titanium ratio of 8:1 was injected. After 19.7 hours, the reactor was cooled, vented and the polypropylene so produced was isolated. The yield was 20 grams per millimole of titanium.

EXAMPLE 46

A 0.33 g. sample of the catalyst prepared in Example 45 was transferred to a polymerization vessel containing 300 ml. of heptane. The vessel was pressured to 30 p.s.i.g. with ethylene at 80° C. and then an amount of ethylaluminum dichloride equal to an aluminum to titanium ratio of 5:1 was injected. After 22.5 hours, the reactor was vented and cooled and the polyethylene was isolated. The yield was 270 g. per millimole of titanium and the rate was 8.6 g. per millimole of titanium per atmosphere per hour.

EXAMPLES 47 AND 48

In each case a polymerization vessel filled with argon was charged with 0.4 g. of a microspheroidal silica gel, which had been annealed at 300° C. for 2 days, and 50 ml. of heptane. The reactor was sealed, flushed with ethylene and then pressured to 30 p.s.i.g. with ethylene. In Example 47 there was then injected 4.0×10⁻⁵ moles of triethylaluminum and 2.0×10⁻⁵ moles of tetrakis(norbornyl) zirconium and the polymerization was maintained at 35–40° C. for 1.5 hours. In Example 48 there was injected 2.0×10⁻⁵ moles of tetrakis(norbornyl) hafnium and the polymerization was maintained at 55° C. for 1.4 hours. The yield of polyethylene produced in Example 47 was 49 g. per millimole of zirconium at a rate of 11 g. per millimole of zirconium per atmosphere per hour. The yield of polyethylene produced in Example 48 was 19 g. per millimole of hafnium at a rate of 6.8 g. per millimole of hafnium per atmosphere per hour.

What I claim and desire to protect by Letters Patent is:

1. An organometallic compound having the formula $Y_4M$ where Y is the bicyclic radical

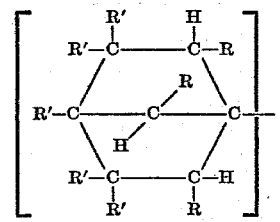

where one R is H or $CH_3$ and the other R's are H and each of the R's is H or $CH_3$, the total number of $CH_3$ groups attached to the bicyclic radical is 0 to 3, and M is a transition metal selected from Ti, Zr, Hf, V, Cr, Mn, Fe and Co.

2. The compound of claim 1 where the bicyclic radical is 1-norbornyl.

3. The compound of claim 1 where the bicyclic radical is 1-camphyl.

References Cited

UNITED STATES PATENTS

| 2,566,208 | 8/1951 | Jenkins. | |
| 3,093,671 | 6/1963 | Ihrman et al. | 260—438 |
| 2,105,084 | 9/1963 | Wilkinson | 260—429 |
| 3,141,031 | 7/1964 | Wilkinson | 260—439 |
| 3,254,129 | 5/1966 | Brown | 260—606.5 |

HELEN M. S. SNEED, Primary Examiner

U.S. Cl. X.R.

252—431 R; 260—429 CY, 429.5, 438.5 R, 439 CY